United States Patent [19]

Mongeau

[11] Patent Number: 4,691,133

[45] Date of Patent: Sep. 1, 1987

[54] IRON-FREE ROTARY DISK ELECTRICAL MACHINE

[75] Inventor: Peter P. Mongeau, Needham, Mass.

[73] Assignee: Electromagnetic Launch Research, Inc., Cambridge, Mass.

[21] Appl. No.: 883,344

[22] Filed: Jul. 8, 1986

[51] Int. Cl.[4] ...................... H02K 31/02; H02K 1/22; H02K 16/00

[52] U.S. Cl. ..................................... 310/178; 310/114

[58] Field of Search ............... 310/112, 114, 126, 166, 310/178, 206, 268

[56] References Cited

U.S. PATENT DOCUMENTS 3,407,320 10/1968 McLean .............................. 310/114
3,548,231 12/1970 MacNab ............................. 310/178
4,514,653 4/1985 Batni .................................. 310/268
4,602,177 7/1986 Eckels et al. ......................... 310/57

*Primary Examiner*—Patrick R. Salce
*Assistant Examiner*—D. L. Rebsch
*Attorney, Agent, or Firm*—Joseph S. Iandiorio; William E. Noonan

[57] ABSTRACT

A rotary electrical machine having one or more rotor elements comprising non-magnetic conductors extending outwardly from the drive shaft axis and electrically coupled together at terminal portions, a device for producing excitation current through the rotor elements, and one or more stator elements, interleaved between the rotor elements, including elongated, non-magnetic electrical conductors extending outwardly with respect to the longitudinal axis of the drive shaft.

33 Claims, 6 Drawing Figures

IRON-FREE ROTARY DISK ELECTRICAL MACHINE

FIELD OF THE INVENTION

This invention relates to rotary electrical machines and more particularly those capable of producing power pulses of about one half to five seconds in duration at a voltage of several thousand volts and also capable of operating continuously.

BACKGROUND OF THE INVENTION

Short bursts of electric power are conventionally supplied by means of capacitors. Capacitors are suitable for applications such as photo-flash units which involve relatively small amounts of stored energy, ranging from several joules to several kilojoules. However, capacitors are too large and expensive for applications involving several megajoules of stored energy. Such applications require energy supplies in which the energy is derived from a storage inductor. Megajoule pulsed power applications include electromagnetic launchers, such as aircraft catapults and guns, percussion welding machines, pulsed magnetic field metal forming machines, pulsed lasers, and x-ray and radar systems. Since storage inductors dissipate their energy in a matter of seconds, they must be energized much more quickly than capacitors; this requires rotary generators capable of delivering short bursts of high power. Conventional generators cannot be forced to operate above their rated output, even for short bursts, because power output is limited by magnetic saturation of their iron circuits. In addition, only a small fraction of available volume is used for conductors.

Two types of machines exist today which are capable of high power pulse duty: homopolar generators, also called asynchronous generators, or Faraday disk generators, which are dc generators in which a conducting disk or cylinder rotates in a stationary magnetic field and compulsators. Homopolar generators operate at very low voltage and very high current, and require contact brushes for their output current. They have the additional disadvantage of slow response to excitation control, and inability to use switching elements for output current control. Their usefulness is therefore restricted to loads having very low impedance. Compensated pulsed alternators, also called compulsators, can operate at high voltage, but produce very short pulses of power which last only a fraction of one revolution, typically milliseconds. Existing generators, both dc and ac, are designed for maximum efficiency and continuous operation, and incorporate an iron magnetic circuit to minimize the excitation current, and only a very small fraction of the available rotor and stator volume is occupied by conductors, typically about one percent. Generators which do not use iron are certain types of superconducting generators. Since superconductors have no ohmic losses the excitation field can be produced easily without the use of iron.

SUMMARY OF THE INVENTION

It is therefore an object of this invention to provide a rotary electrical machine capable of generating short-duration, high-voltage pulses.

It is a further object of the invention to provide a rotary electrical machine capable of generating output pulses of one half to five seconds in duration at very high voltages.

It is a further object of the invention to provide such power pulses in the form of alternating current at virtually any desired voltage and without the need for collecting brushes in the output circuit thereof.

It is a further object of the invention to provide a light, compact rotary electric machine which may be modular in construction and capable of operating at high rotational speeds.

It is a further object of the invention to provide such a rotary electric machine which is light and compact.

It is yet a further object of the invention to provide a rotary electric machine having rotor elements capable of withstanding substantial centrifugal stresses, which may be constructed entirely without iron, in either the stator or the rotor, and thus enable much of the available volume within the machine to be occupied by copper or aluminum electrical conductors, to provide a more compact machine.

The invention features a rotary electrical machine having one or more rotor elements, each having a plurality of non-magnetic outwardly extending rotor conductors carrying excitation current, and one or more stator elements, interleaved between the rotor elements, including outwardly extending elongated, non-magnetic electrical conductors.

In a preferred embodiment, serially connected rotor disks are provided having radial slots therein defining excitation current paths, primarily toward and away from the rotational axis of the machine. The stator elements include first and second sets of conductors lying within first and second planes respectively, and have toroidal windings of spoke-like configuration. The thick copper or aluminum rotor disks have a low resistivity, high heat capacity and may be rotated at very high rotational velocities.

A preferred embodiment utilizes structural hoops affixed to the peripheral disk portions to limit extreme radial centrifugal stresses during even higher rotational operating velocities. The machine can serve as a generator or a motor, and for pulse-duty or continuous-duty operation. For continuous-duty operation, the rotor disks are preferably provided with forced flow cooling channels, and are laminated together via insulating disks.

DISCLOSURE OF PREFERRED EMBODIMENT

Other objects, features and advantages of the invention will occur from the following description, of preferred embodiments and the accompanying drawings in which.

Figure 3:
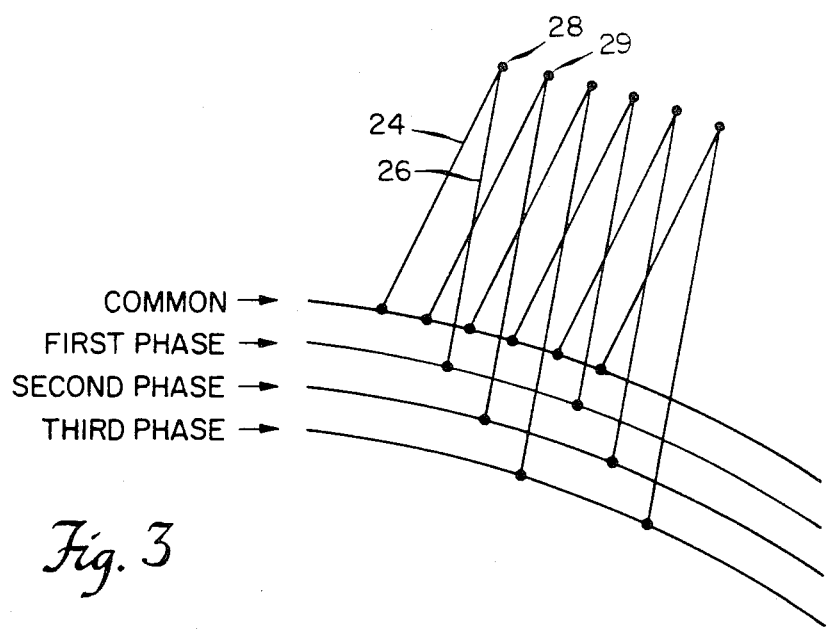
Figure 4:
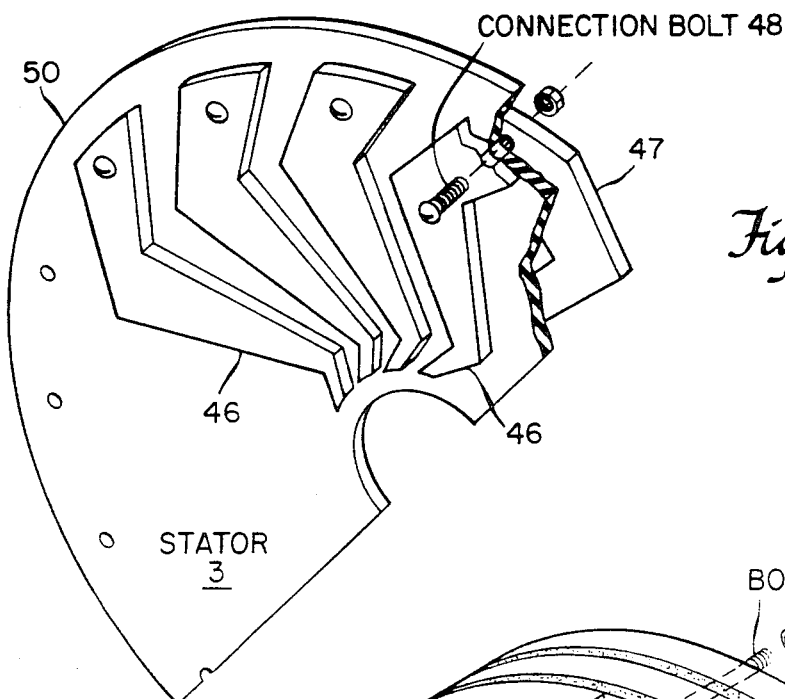
Figure 5:
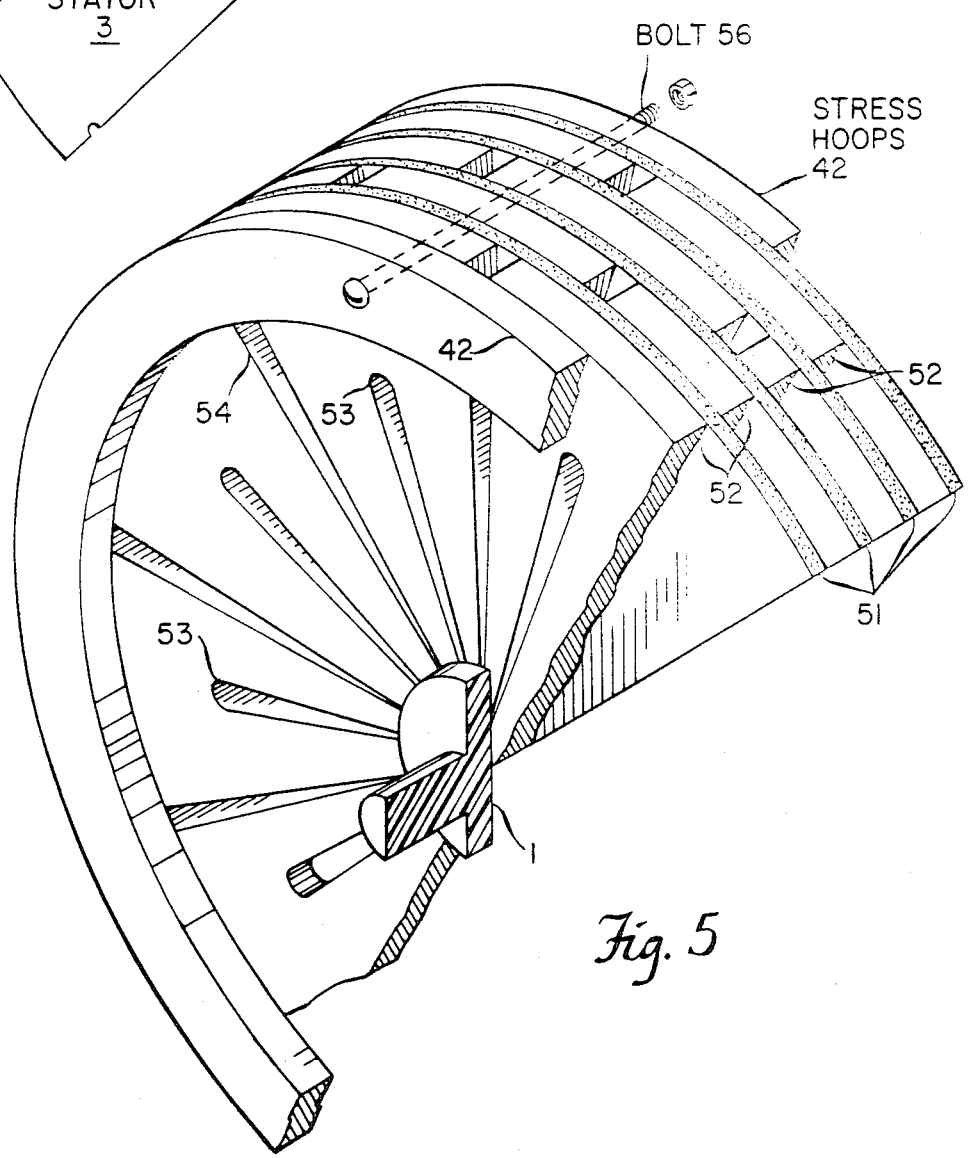
Figure 6:
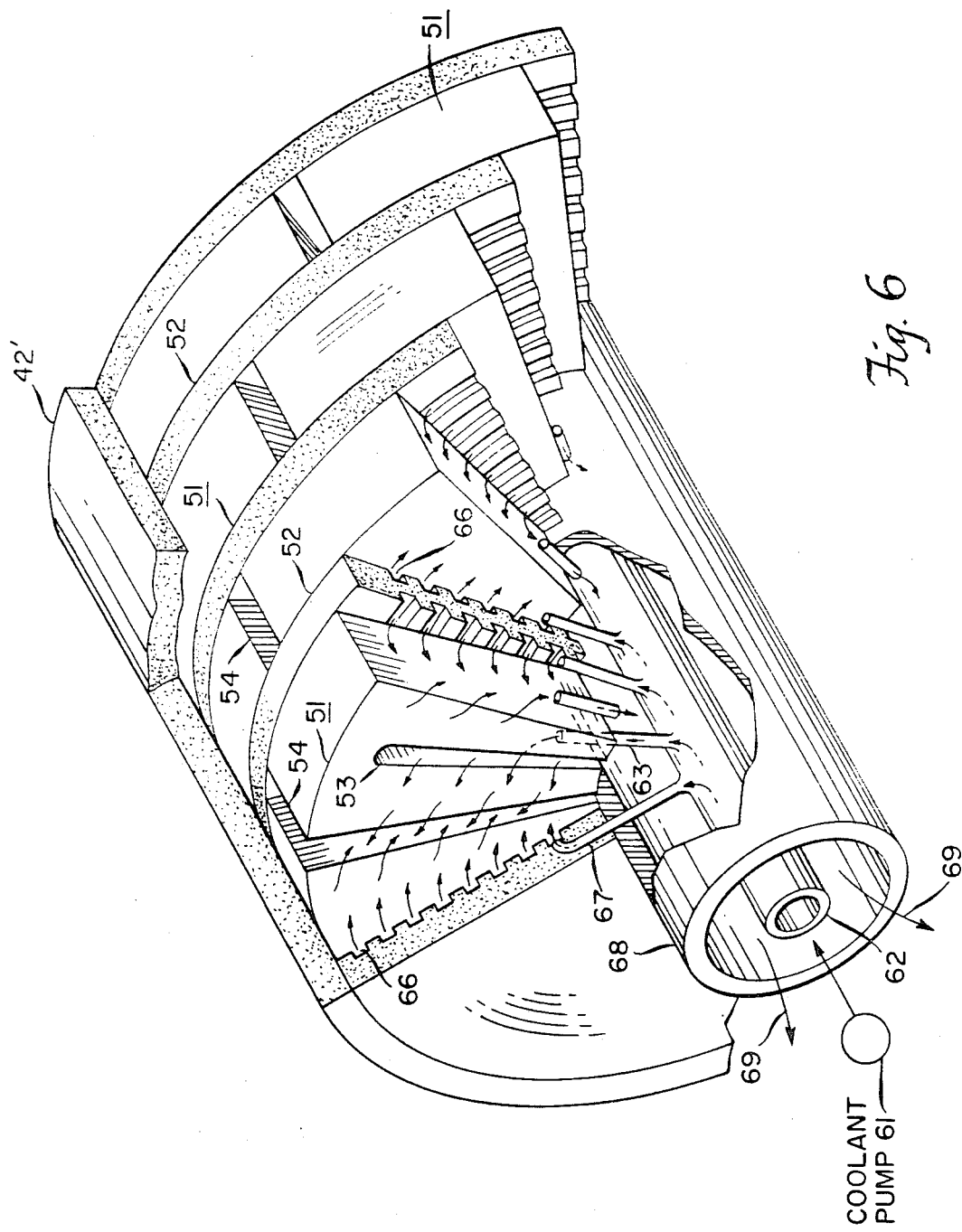

FIG. 3 schematically illustrates the manner in which the stator windings are interconnected to form toroidal winding configurations;

FIG. 4 illustrates a partial axonometric view of a second form of a stator disk;

FIG. 5 illustrates a partial axonometric view of a composite laminated rotor element; and FIG. 6 illustrates a partial axonometric view of a cooled laminated rotor element.

A preferred generator embodying this invention differs from conventional generators in that it uses about 60 percent rather than one percent of its volume for conductors. This is accomplished by eliminating the conventional iron magnetic circuit. Elimination of iron increases the power required to generate a given excitation field intensity, and for this reason workers in the art do not eliminate iron. However, the increased power cost of operating without iron is more than compensated by the increased utilization of space, so that the overall efficiency of an iron-free machine is not very much lower than the efficiency of a conventional iron machine (about 95% compared to about 99%).

The machine according to this invention, is also equally useful for continuous duty applications where maximum energy density is more important than maximum efficiency.

Figure 1:
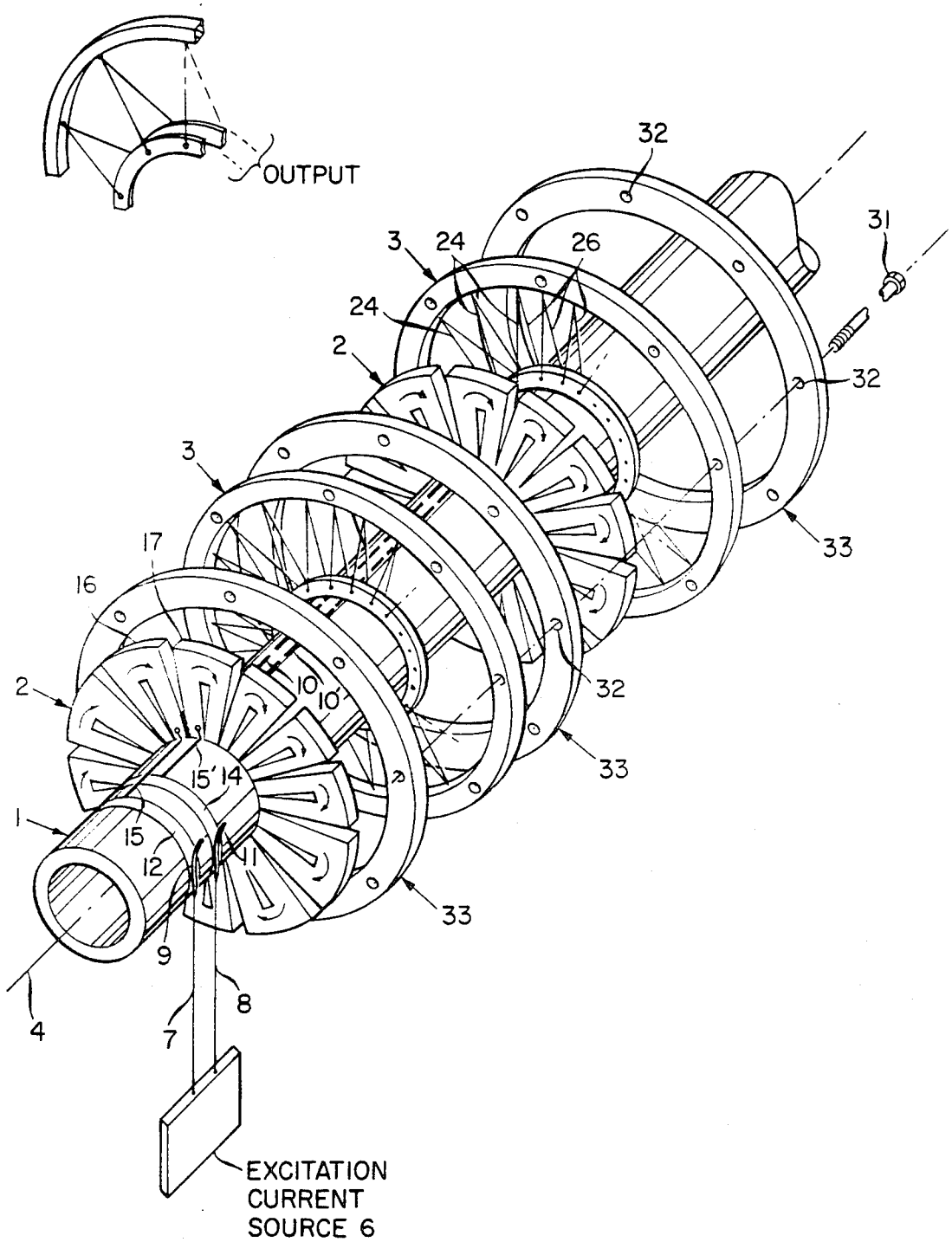
FIG. 1 illustrates an assembly view of the components of the preferred embodiment.
Figure 2:
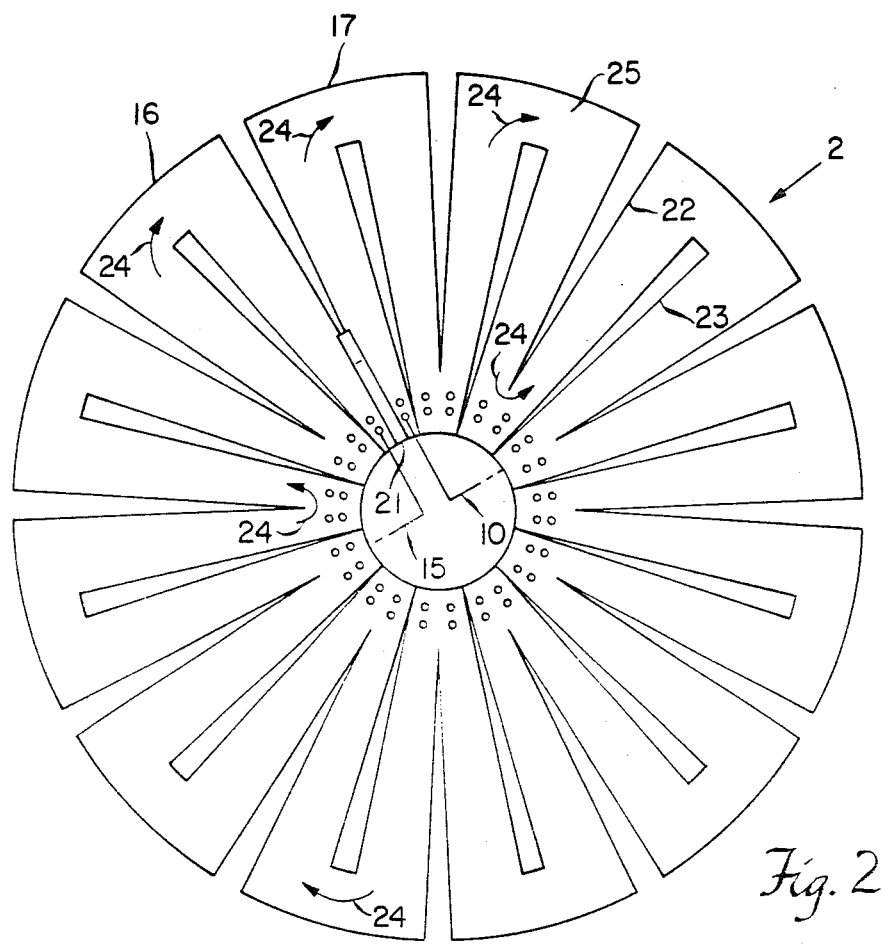
FIG. 2 illustrates one rotor disk in greater detail.

In FIG. 1, drive shaft 1 has a plurality of rotor disks 2 rigidly affixed thereto, interleaved with stator disk elements 3 as illustrated. Input shaft 1 is driven by a motor (not shown) and rotates about longitudinal axis 4. A source of excitation current 6 is coupled to rotor disks 2 through leads 7 and 8, and brushes 9 and 11 which contact commutator rings 12 and 14. Ring 12 is electrically connected to the pie-shaped segment 16 of disk 2 via lead 15, whereas ring 14 is coupled to the pie-shaped segment 17 of disk 2 via 15' in a single disk machine. In a two rotor machine, segment 17 would be connected to segment 16 of the second rotor and segment 17 of the second rotor would be connected to ring 14 to thus connect both rotors in series. The series connection of the second disk is indicated by leads 10 and 10', mounted upon shaft 1. All of the pie-shaped segments of the rotor disk are connected in series, due to the slotted disk lobe configuration. Optionally, excitation current may be inductively supplied without brushes, by means of a separate excitation rotor provided with on-board rectifiers, the output thereof being utilized to excite the other rotors mounted on the same shaft. Rotor disk 2 is shown in greater detail in FIG. 2 and insulator member 21 is shown as one exemplary means to electrically isolate pie-segment element 16 from element 17. Disk 2 of copper or aluminum, has radial slots 22 and 23 formed therein to produce a series of current carrying lobes defining a meandering current path around the disk, such current path being schematically represented by arrows 24. Thus, except for peripheral disk portions 25 and inner disk portions where the direction of current flow reverses, current flows within each rotor disk element toward and away from drive shaft 2, substantially perpendicular to the longitudinal axis 4 of the drive shaft. The rotor disks are preferably coupled in series via leads 10 and 10' positioned within driveshaft 1, to minimize the excitation current.

The stator disk windings preferably resemble a bicycle wheel in general configuration. As indicated in FIG. 1, the stator disks 3 have spoke-like conductors, lying in two mutually exclusive planes which are substantially perpendicular to longitudinal axis 4. Thus conductors 26 lying in a first plane intersect conductors 24 lying in the second plane forming a small acute angle with respect to the first plane, between 5 and 10 degrees. A small segment of spoke conductors 24 and 26 are schematically illustrated in FIG. 3; spoke conductors 24 are connected to spoke conductors 26 at peripheral points 28 and 29, thereby forming a series of toroidal windings, or laps. Each of these two-spoke laps is connected at its other extremity to current collectors in such a manner as to form a multi-phase lap winding. The connection shown schematically in FIG. 3 forms a three-phase Y-connected lap winding, for example. However, more than three phases may be provided. This connection pattern of course is repeated all the way around each stator and results in a set of toroidal poly-phase windings for producing the high voltage poly-phase AC output of the alternator. The conductors may be wire, or stamped bars such as 46 and 47 illustrated in FIG. 4, which are similar in geometry to those utilized in small printed circuit motors, but substantially larger. They are electrically connected together by rivets or bolts 48 to form a lap-winding of the required pole pitch. A non-conductive separator disk 50 is also shown.

As shown in FIG. 1, assembly drawbolts 31 pass through apertures 32 of stator clamping rings 33 to form the housing, coupling the stator disks 3 together. The resulting multi-disk configuration provides good utilization of the excitation field volume, which increases the thermal performance limit, by both increasing heat capacity and decreasing resistive heating, due to the high electrical conductivity and high heat capacity of the thick copper or aluminum rotor disks. A preferable rotor disk configuration has an outside diameter of about 120 cm, an inside diameter of 24 cm and a plate thickness of 2.5 cm. Thus a thick rotor disk plate, preferably made of aluminum alloy such as 6101-6, is preferred. It should be appreciated that this structure produces long tubular bundles of excitation flux, generated more efficiently in an iron-free structure relative to the radial pole pattern of a conventional, cylindrical machine. Another beneficial result enjoyed by providing thick slotted disk rotors, is that they can withstand considerable radial centrifugal stresses without additional reinforcing structure, when driven at high rotational speeds, and thus high power output is enabled. Stress hoops 42 shown in FIG. 5, may be provided to permit even higher rotational rotor speeds by reinforcing against extremely high centrifugal radial rotor forces. This is accomplished by the resulting tensile stretching of the hoops, which may, if desired, be rigidly affixed to a single disk rotor. Besides permitting even higher speed rotation of the disks, optional stress hoops 42, increase the moment of inertia for energy storage.

In FIG. 5, individual rotor disks 51 form laminated layers which are separated by insulating disks 52. The aforesaid stress hoops 42 for providing added moment of inertia and even higher speed operation are also shown, together with the aforesaid disk slots 53 and 54. The entire laminated "sandwich" may be bolted together by bolts, one of which is schematically indicated at 56. It is important to note that the disk reinforcing stress hoops are made of non-conducting material. The rotor disks in all described embodiments of the invention are preferably connected electrically in series, thereby reducing the required excitation current which is preferably supplied through brushes. An advantage of the laminated rotor is that the slotted disks can be staggered, thereby eliminating the field asymmetry of a single slotted disk.

The staggering of the slotted disks is clearly indicated in FIG. 6, illustrating another laminated rotor embodiment of the invention, useful for continuous operation, whereby a coolant, such as liquid nitrogen, is forced into the laminated rotor element to enable such continuous operation. The radially extending rotor disk slots such as 53, delineate the excitation current path, and also function to distribute the coolant. A coolant pump 61 feeds liquid nitrogen, for example, under pressure to the inner tubular member 62, and numerous ducts such as 63 are provided to feed the coolant into each of the numerous radial slots 53. Insulating disks 52 have a plurality of grooves such as 66 formed therein which are coupled to the interior of coolant supply tube 62 via another plurality of feed ducts such as 67. The circulation of coolant within grooves 66 directly cools the faces of the disk elements 51. The return flow path of the coolant is through slots 54 between the rotor lobes and back into the space between the outside surface of inner feed tube 62 and the inside surface of the outer tubular driveshaft member 67. Since the liquid nitrogen has absorbed considerable heat, it will generally exit from hollow shaft 68 primarily in a gaseous state. It may be noted that the staggering of the slotted disks also aids in rendering the cooling effect more uniform. In the embodiment of FIG. 6, the stress hoops could take the form of an elongated cylindrical element illustrated in part at 42'.

The presently contemplated best mode of practising the invention is to construct the alternator in accordance with the teachings of FIGS. 5 and 6. Laminated embodiments may utilize thinner conductive rotor disks connected in series to minimize the excitation current. The staggering of the disks clearly indicated in FIG. 6, also improves the rotational symmetry of the excitation field, so that the peripheral circuit is closed, rather than alternately opened as in a single disk. FIG. 6 clearly indicates the occupation of at least half of the interior volume of the electrical machine by the conductive rotor elements.

Typical excitation current for a pulse duty machine, with a 5-second rating of 27 MW and a 1-second rating of 136 MW would be 40 kA at 6.32 volts, which amounts to 253 kW. This assumes a single rotor disk with all lobes connected in series. It is desirable to reduce the current and increase the voltage at this same excitation power level, since the required brush area is proportional to current and independent of voltage; laminating the rotor from several thinner disks connected in series is the preferred approach.

Although specific features of the invention are shown in some drawings and not others, this is for convenience only as each feature may be combined with any or all of the other features in accordance with the invention.

Other embodiments will occur to those skilled in the art and are within the following claims.

What is claimed is:

1. A rotary electircal machine comprising:
   a drive shaft having a longitudinal axis of rotation;
   one or more rotor elements mounted upon said drive shaft substantially perpendicular to the longitudinal axis thereof, said rotor elements comprising non-magnetic disks of high electrical conductivity, each said disk having radial slots therein forming a plurality of current carrying lobes connected in series and defining a meandering current path around said disk;
   means for producing excitation current along said meandering path within said disks in a transverse plane with respect to the longitudinal axis of said drive shaft; and
   a plurality of stator elements, adjacent said rotor elements, said stator elements comprising first and second sets of substantially radially extending elongated electrical conductors oriented in first and second planes respectively, transverse with respect to the longitudinal axis of rotation of said drive shaft.

2. The rotary electrical machine as set forth in claim 1 wherein said radially extending elongated conductors of said stator elements comprise toroidal windings.

3. The rotary electrical machine as set forth in claim 2 wherein said first and second planes intersect at an angle of between 5 and 10 degrees.

4. The rotary electrical machine as set forth in claim 1 wherein said disks comprise thick solid, monolithic bodies, having a high heat capacity, and said disks include channels therein for conducting a coolant therethrough.

5. The rotary electrical machine as set forth in claim 2 wherein said disks comprise thick solid, monolithic bodies, having a high heat capacity, and said disks include channels therein for conducting a coolant therethrough.

6. The rotary electrical machine as set forth in claim 3 wherein said disks comprise thick solid, monolithic bodies, having a high heat capacity, and said disks include channels therein for conducting a coolant therethrough.

7. The rotary electrical machine as set forth in claim 1 further including means for electrically coupling said disks in series.

8. The rotary electrical machine as set forth in claim 2 further including means for electrically coupling said disks in series.

9. The rotary electrical machine as set forth in claim 4 further including means for electrically coupling said disks in series.

10. The rotary electrical machine as set forth in claim 1 further including stress reducing hoops affixed to peripheral portions of said rotor elements for reducing radial stress due to high speed rotation of said rotor elements.

11. The rotary electrical machine as set forth in claim 2 further including stress reducing hoops affixed to peripheral portions of said rotor elements for reducing radial stress due to high speed rotation of said rotor elements.

12. The rotary electrical machine as set forth in claim 4 further including stress reducing hoops affixed to peripheral portions of said rotor elements for reducing radial stress due to high speed rotation of said rotor elements.

13. The rotary electrical machine as set forth in claim 5 further including stress reducing hoops affixed to peripheral portions of said rotor elements for reducing radial stress due to high speed rotation of said rotor elements.

14. A substantially iron free rotary electrical machine comprising:
   a drive shaft having a longitudinal axis of rotation;
   one or more rotor elements mounted upon said drive shaft transverse with respect to the longitudinal axis thereof, each of said rotor elements comprising a plurality of non-magnetic rotor conductors extending transversely with respect to said longitudinal axis and electrically coupled together in series;
   means for producing excitation current through said rotor conductors; and
   one or more stator elements, interleaved between said rotor elements, said stator elements comprising first and second sets of elongated, spoke-like, non-magnetic electrical conductors, each said set extending transversely with respect to the longitudinal axis of said drive shaft.

15. The rotary electrical machine as set forth in claim 14 wherein said elongated spoke-like conductors of said stator elements comprise toroidal windings lying in first and second planes, for producing current flowing back and forth, toward and away from said drive shaft.

16. The rotary electrical machine as set forth in claim 15 wherein said first and second planes intersect at an angle of between 5 and 10 degrees.

17. The rotary electrical machine as set forth in claim 14 wherein said rotor conductors comprise thick conductive bars for conducting said excitation current alternately toward and away from said longitudinal axis, and further including means for electrically coupling said rotor elements in series.

18. The rotary electrical machine as set forth in claim 15 wherein said rotor conductors comprise thick conductive bars for conducting said excitation current alternately toward and away from said longitudinal axis, and further including means for electrically coupling said rotor elements in series.

19. The rotary electrical machine as set forth in claim 16 wherein said rotor conductors comprise thick conductive bars for conducting said excitation current alternately toward and away from said longitudinal axis, and further including means for electrically coupling said rotor elements in series.

20. The rotary electrical machine as set forth in claim 17 wherein said rotor conductors form portions of a slotted rotor disk.

21. The rotary electrical machine as set forth in claim 14 further including stress reducing hoops affixed to peripheral portions of said rotor elements for reducing radial stress due to high speed rotation of said rotor elements.

22. The rotary electrical machine as set forth in claim 15 further including stress reducing hoops affixed to peripheral portions of said rotor element for reducing radial stress due to high speed rotation of said rotor elements.

23. The rotary electrical machine as set forth in claim 17 further including stress reducing hoops affixed to peripheral portions of said rotor element for reducing radial stress due to high speed rotation of said rotor elements.

24. The rotary electrical machine as set forth in claim 18 further including stress reducing hoops affixed to peripheral portions of said rotor elements for reducing radial stress due to high speed rotation of said rotor elements.

25. The rotary electrical machine as set forth in claim 20 further including stress reducing hoops affixed to peripheral portions of said rotor elements for reducing radial stress due to high speed rotation of said rotor elements.

26. A substantially iron free rotary electrical machine having a predetermined interior volume comprising:
   a drive shaft having a longitudinal axis of rotation;
   one or more rotor elements mounted upon said drive shaft transverse with respect to the longitudinal axis thereof, each of said rotor elements comprising a plurality of non-magnetic rotor conductors extending transversely with respect to said longitudinal axis and electrically coupled together at terminal portions thereof;
   means for producing excitation current through said rotor conductors; and
   one or more stator elements, interleaved between said rotor elements, said stator elements comprising elongated, non-magnetic electrical stator conductors extending transversely with respect to the longitudinal axis of said drive shaft.

27. The rotary electrical machine of claim 26 wherein the combined volume of said rotor conductors and said stator conductors occupies at least half of the interior volume of said rotary electrical machine.

28. The rotary electrical machine of claim 27 wherein said rotor elements comprise slotted disks, the slots therein defining excitation current paths.

29. The rotary electrical machine of claim 28 including means for electrically coupling said disks in series.

30. The rotary electrical machine of claim 29 wherein said slotted disks are interleaved with electrically non-conductive disks laminated to said slotted disks to form a laminated rotor element.

31. The rotary electrical machine of claim 30 including means for forcing a coolant through the slots of said slotted disks.

32. The rotary electrical machine of claim 30 wherein corresponding slots of adjacent disks are angularly offset with respect to each other.

33. The rotary electrical machine of claim 31 wherein corresponding slots of adjacent disks are angularly offset with respect to each other.

* * * * *